Aug. 18, 1931. L. DUFOUR 1,819,950
TILLING MACHINE
Filed Feb. 2, 1929
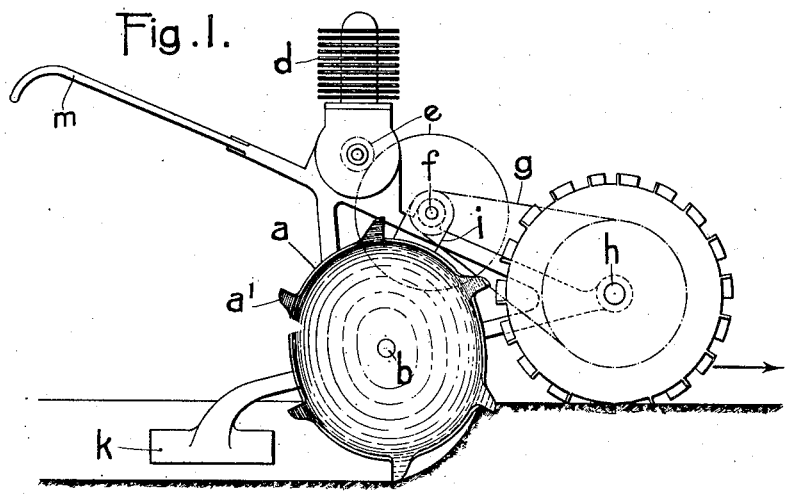
Fig. 1.
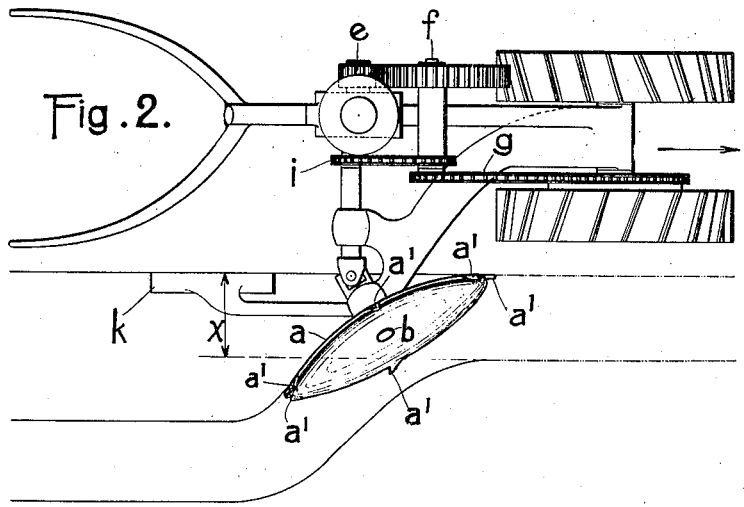
Fig. 2.
Fig. 4. Fig. 5. Fig. 6.
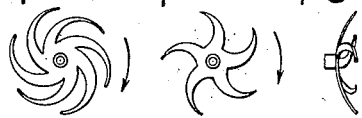
Fig. 3.
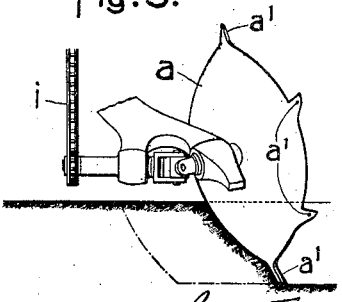
Fig. 7. Fig. 8. Fig. 9.
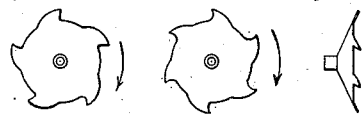

Patented Aug. 18, 1931

1,819,950

UNITED STATES PATENT OFFICE

LÉON DUFOUR, OF VERSOIX, NEAR GENEVA, SWITZERLAND

TILLING MACHINE

Application filed February 2, 1929, Serial No. 336,950, and in Germany February 13, 1928.

This invention relates to improvements in rotary ploughs.

It is already generally known that the work produced by a plough drawn by a tractor is very slight in comparison with the necessary motor power, resulting in a poor utilization of the power of the tractor motor. Taking the case of a plough drawing a furrow 12 inches wide and 8 inches deep at a speed of 3 feet per second in soil offering a resistance of approximately 7 lbs. per square inch, the tractive power requires merely for this cutting purpose amounts of 2050 foot pounds per second, that is to say, 4 H. P. As is known, the driving wheels of a tractor cannot exert a tractive force of more than about 0.35 of the weight of the tractor. In this instance, the tractive force required is 650 lbs., so that the necessary weight is $$\frac{650}{0.35} = 1600 \text{ lbs.}$$

It is known from experience that a tractor with a weight of 1600 lbs. must be fitted with a motor of at least 12 to 16 H. P. in order to obtain an effective work of 4 H. P. at the plough.

This poor result is due solely to the fact that the power of the motor must first of all be converted by the driving wheels into horizontal tractive force, and further to the fact that the wheels, when working on soft soil, have an extremely low efficiency. This sufficiently explains the poor results hitherto obtained by the use of plough tractors. agriculture.

Now the object of this invention is to pass the motor power directly on to a specially constructed tool, which by reason of its suitable shape, is in a position to turn out a furrow similar to that produced by an ordinary plough, but without the necessity of having to convert the motor power into a horizontal tractive effort. The motor and the tool are, of course, carried by a vehicle, the forward movement of which is produced by the same motor. Since by this means said source of low efficiency of the motor tractors is eliminated here, the power of the motor can correspond much better to the work produced, so that a considerably weaker and lighter machine will ensue and one which naturally will prove much more satisfactory from the point of view of rolling resistance, price and maintenance charges than the present plough tractors.

According to this invention a calotte or hollow-cone shaped rotary tool facing in the known manner with its hollow side forwardly and outwardly, and being driven by the motor of the vehicle in the direction of the movement thereof comprises a few more or less radial cutting knives or tines lying within its calotte or cone surface, and thereby owing to the cutting speed being greater than the vehicle speed, the furrow is cut in such a way that the knives run from its inwardly front top to its outwardly rear bottom in an obliquely arch-shaped curve, thus cutting through the soil across the width of the furrow slice.

Consequently this tool does not only not need the assistance of tractive power coming from the driving means but produces itself rather a reaction thrust pushing the vehicle forwards. In view of the fact that the axis of the cutting tool lies obliquely to the direction of travel, the knives on the cutting tool describe cycloidal spirals. If in addition to this the outer end of the tool axle lies higher than the inner one, the said spirals take up a rearward inclination in addition to their lateral inclination. The several blades or knives of the cutting tool thus describe a succession of separate inclined interlaced cycloidal spirals. When the tool disc has penetrated into the soil over about one-third or more of its diameter, the blades or knives cut across the width of the furrow slice (for example, from the inside front top towards the rear outside bottom) a series of ribbon-like cuts which approach very closely towards each other, or even overlap. In this manner the strip of ground that is to be detached is first of all undercut and then loosened. The further rotation of the cutting knives from the rear outward bottom upward, and the one-sided friction of the tool and its hollow form itself effect an outwardly turning and pressing of the loosened strip of ground.

Owing to this process, slices (similar to a certain extent to ordinary ploughed furrow slices) are loosened and turned with this difference, however, that their cross section will not be rectangular, but somewhat rounded off below and inclined, something like the cross section of a shaving produced by a round edged iron planing tool.

Thus, the soil is not compressed as in the case of the plough share, but, on the contrary, is cut smoothly and without being squeezed or compressed, but rather drawn and turned at the same time.

Instead of forming the hollow calotte disc by means of a crown or star of rotating cutting blades or knives, it may also be formed of a concave metal disc fitted on its circumference with projecting cutting teeth. The ratios between the travelling speed of the vehicle, the circumferential speed of the cutting teeth, the radial height thereof and their distance apart from each other should be such that the gap between two adjacent teeth passes in the slot cut by the preceding tooth, without (as is the case with the familiar disc ploughs) cutting the untouched ground itself, which again would necessitate a horizontal push.

Further, the radial height of the cutting teeth and their distance apart from one another should be such as to allow the clearing of any obstruction being formed in the gaps between the teeth by earth, grass, manure, etc. Owing to the fact that the spiral shaped ribbon-like cuts are in the form of a succession of steps, without forming a continuous surface in the soil, the strip of ground is not only undercut, but is also loosened and somewhat crumbled, which is precisely what is desired.

In this way, the entire work of undercutting, loosening, crumbling and turning of a strip of ground is accomplished directly by the rotating cutting tool, that is to say, by the motor, without any losses other than the unavoidable gear losses of the direct tool gearing, so that the total weight is reduced to a minimum, as is also the cost of the machine.

In addition to this, the compression of the furrow slice produced by the pushing plough share is done away with, as is also the disadvantageous pressure on the soil exerted by the ordinary heavy loaded plough tractor wheels.

In order that the invention may be fully understood I will now describe it by way of example by reference to the accompanying drawings, in which:—

Figure 1 is a side view;
Figure 2 is a top view of the entire machine constructed in accordance with the invention;
Figure 3 shows a detail; and
Figures 4, 5, 6, 7, 8 and 9 show various forms of construction of the cutting tool.

The cutting tool shown in Figures 1 to 3 consists of a rotating, hollow, calotte-shaped disc $a$ which has its hollow face inclined sidewardly and forwardly for the purpose of going over a working path having a width $x$. On its circumference the disc $a$ is fitted for example with six projections or cutting teeth $a^1$ (the number of these is, however, not limited), said teeth $a^1$ being located within the disc plane or surface at a certain distance from one another. The disc $a$ is mounted on the outer end of an axis $b$ which at its inner end is coupled to the driving shaft $c$ and is inclined or directed forwardly from the inside towards the outside (Figure 2) and from the inside towards the outside upwardly (Figure 3). Whilst the amount of the first forward inclination may be as much as 30° to 50°, the upward direction or inclination is at a smaller angle, say 10° to 20° with respect to the horizontal line.

The motor $d$, by means of the gearing $e$, drives the transmission shaft $f$, from which, by means of the chain drive $g$, the driving axle $h$ of the vehicle may be driven, the tool driving shaft $c$ being driven by means of the chain drive $i$. The disc $a$ is driven by these means at a peripheral speed which may be twice or three times the peripheral speed of the driving or running wheels of the vehicle, so that in its wheel-like forward movement across the width of the working path and with the aid of its cutting teeth $a^1$ it undercuts the strip of ground to be loosened and turned, by means of a rapid succession of cycloidal, obliquely spiral cuts, from above inside in front downwards towards the rear along a curve, and thence draws the soil rearwardly, upwardly and outwardly, turns it and throws it over. Thus, the strip of ground is loosened and turned directly by means of the cutting tool. At the same time, owing to these rapid, oblique curved backwardly cuts from the front backwards, and owing to the lifting of the ground, a reaction is set up, which endeavours to force the cutting disc, and consequently the vehicle, against the shoulder of the furrow and towards the front. The lateral reaction against the shoulder of the furrow is taken up by the slide shoe $k$. An inclined supporting wheel, such as is usual in the case of multishare ploughs, may be substituted for this slide shoe. The reaction towards the front results in a certain amount of advance of the vehicle or at the very least in a strong contribution or aid of the ploughing tool to the forward motion of the vehicle. The steering of the vehicle is effected in the usual way by means of a double plough-handle $m$.

If necessary, one of the driving wheels of the vehicle, as is the case with the ordinary plough, can run in the previous furrow; this, however, is not shown in the drawings.

The cutting parts of the tool can be given any kind of shape, provided only that the blades lying in the disc surface are set more or less radially, in order directly to utilize the power of the motor for cutting the ground, and provided that the tool shows approximately the ground-form of a familiar hollow thin-walled skull-cap or calotte shaped disc-plough or of a thin-walled flat hollow cone, in order to assist in the proper turning of the strip of ground.

By way of example, Figure 4 shows a star shape, in which the end parts of the tine-like arms of the star form the cutting parts. Figure 5 shows a similar star shape, in which however the arms of the star are turned in the opposite direction. Figure 6 shows a cross section through this star shape for explaining the calotte shape thereof, and it shows that this tool represents a dented calotte or cupola. Figures 7 and 8 show a pronounced flat cone shape with cutting teeth projecting from the edge. The cutting teeth shown in Figure 7 are shaped like the teeth of a saw which, according to the nature of the soil, may prove disadvantageous, owing to the gaps between the teeth being clogged up by grass or straw. On the other hand, the cutting edges of the teeth shown in Figure 8 are bent slightly backwards, thus preventing any clogging. Figure 9 shows a cross section through the tool shown in Figure 8.

Obviously, the machine could be fitted with several cutting discs of the described type on a common axis or on separate axes, so as to cut several furrows simultaneously.

What I claim is:—

In a tilling machine, the combination of a carriage frame, at least one running wheel thereon to support same, a motor drive mechanism on said frame for driving said carriage running wheel, a rotary working shaft carried by said frame in both a forwardly and upwardly oblique position, a star-like, forwardly concave cutter disc on said shaft, having circumferential spaced teeth within the curved surface of the disc, and connecting means between said shaft and the motor drive mechanism so arranged as to drive the cutter disc with a considerably greater peripheral speed than the carriage running wheel for the purpose of causing the cutter disc to undercut the furrow from its inwardly front top to its outwardly rear bottom with a simultaneous advancing action for the machine.

In witness whereof I have hereunto signed my name this 18th day of January 1929.

LÉON DUFOUR.